US010069414B2

(12) United States Patent
Sen et al.

(10) Patent No.: US 10,069,414 B2
(45) Date of Patent: Sep. 4, 2018

(54) SWITCHING VOLTAGE REGULATOR INPUT VOLTAGE AND CURRENT SENSING

(71) Applicant: Infineon Technologies Austria AG, Villach (AT)

(72) Inventors: Sujata Sen, Marina Del Rey, CA (US); Benjamim Tang, Rancho Palos Verdes, CA (US); Darryl Tschirhart, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 149 days.

(21) Appl. No.: 14/676,384

(22) Filed: Apr. 1, 2015

(65) Prior Publication Data
US 2016/0291631 A1  Oct. 6, 2016

(51) Int. Cl.
*H02M 3/158* (2006.01)
*G05F 3/26* (2006.01)

(52) U.S. Cl.
CPC ........... *H02M 3/158* (2013.01); *G05F 3/262* (2013.01)

(58) Field of Classification Search
CPC .. H02M 2001/0009; H02M 2001/0022; G05F 3/262
See application file for complete search history.

(56) References Cited

U.S. PATENT DOCUMENTS

| | | | | |
|---|---|---|---|---|
| 4,027,227 A | * | 5/1977 | Engel | G05F 1/618 323/224 |
| 4,278,930 A | | 7/1981 | Rogers | |
| 4,309,650 A | * | 1/1982 | Boros | H02M 3/157 323/283 |
| 4,811,184 A | * | 3/1989 | Koninsky | H02M 3/3376 323/281 |

(Continued)

FOREIGN PATENT DOCUMENTS

| | | |
|---|---|---|
| CN | 101988943 A | 3/2011 |
| CN | 102263505 A | 11/2011 |

(Continued)

OTHER PUBLICATIONS

Tang, et al., "Switching Voltage Regulator Input Power Estimation", U.S. Appl. No. 14/548,967, filed Nov. 20, 2014.

(Continued)

*Primary Examiner* — Yusef A Ahmed
(74) *Attorney, Agent, or Firm* — Murphy, Bilak & Homiller, PLLC (57) ABSTRACT

A voltage regulator includes a power stage configured to produce an output voltage from an input voltage at an input voltage terminal, a shunt resistor connected in series between the input voltage terminal and the power stage, a first level shifting resistor connected in series between a first terminal of the shunt resistor and a first sense pin of the controller, and a second level shifting resistor connected in series between a second terminal of the shunt resistor and a (Continued)

second sense pin of the controller. The input current of the regulator is sensed as a function of the voltage across the shunt resistor, as shifted down by the level shifting resistors and measured across the sense pins. The input voltage of the regulator is sensed as a function of the current flowing through either one of the level shifting resistors, as measured at one of the sense pins.

23 Claims, 10 Drawing Sheets

(56) References Cited

U.S. PATENT DOCUMENTS

| | | | |
|---|---|---|---|
| 5,889,387 A | 3/1999 | Massie | |
| 5,900,714 A * | 5/1999 | Dubhashi | H02P 6/28 318/811 |
| 6,184,660 B1 * | 2/2001 | Hatular | H02J 7/022 320/139 |
| 6,294,904 B1 * | 9/2001 | Hirst | G05F 1/44 323/283 |
| 6,424,129 B1 | 7/2002 | Lethellier | |
| 7,629,787 B2 * | 12/2009 | Lu | G01R 15/146 324/765.01 |
| 7,695,189 B2 | 4/2010 | Lim et al. | |
| 8,120,336 B2 * | 2/2012 | Mehas | H02M 3/1588 323/224 |
| 8,125,188 B2 | 2/2012 | Doell et al. | |
| 8,710,810 B1 * | 4/2014 | McJimsey | H02M 3/1584 323/272 |
| 9,780,763 B1 | 10/2017 | Lu et al. | |
| 9,941,894 B1 | 4/2018 | Gu et al. | |
| 2005/0071116 A1 | 3/2005 | Kim | |
| 2005/0168198 A1 | 8/2005 | Maksimovic et al. | |
| 2005/0219872 A1 | 10/2005 | Lys et al. | |
| 2005/0248477 A1 | 11/2005 | Jongsma et al. | |
| 2006/0001408 A1 * | 1/2006 | Southwell | H02M 3/1584 323/282 |
| 2006/0267687 A1 * | 11/2006 | Gammie | H03F 1/34 330/260 |
| 2007/0013350 A1 * | 1/2007 | Tang | H02M 3/1584 323/237 |
| 2007/0046281 A1 | 3/2007 | Domingo et al. | |
| 2007/0241763 A1 * | 10/2007 | Panhofer | G01R 19/10 324/664 |
| 2009/0201086 A1 * | 8/2009 | Kindt | H03F 1/34 330/257 |
| 2009/0261795 A1 * | 10/2009 | Tang | H02M 3/1584 323/283 |
| 2009/0306914 A1 * | 12/2009 | Cohen | G01R 21/06 702/60 |
| 2010/0052611 A1 | 3/2010 | Lyle, Jr. | |
| 2010/0231187 A1 * | 9/2010 | Wicht | H02M 3/156 323/282 |
| 2011/0114842 A1 | 5/2011 | Ji et al. | |
| 2012/0062240 A1 * | 3/2012 | Nishijima | G01R 19/0092 324/600 |
| 2012/0101750 A1 | 4/2012 | Chen et al. | |
| 2012/0194258 A1 * | 8/2012 | Nien | H02M 3/1588 327/512 |
| 2012/0281433 A1 | 11/2012 | Yamanaka et al. | |
| 2013/0135047 A1 * | 5/2013 | Danioni | H03F 3/3022 330/252 |
| 2013/0193879 A1 * | 8/2013 | Sadwick | H05B 33/0818 315/307 |
| 2013/0194839 A1 | 8/2013 | Barbati et al. | |
| 2013/0342273 A1 | 12/2013 | Petrie | |
| 2014/0052394 A1 * | 2/2014 | Sun | G01R 35/005 702/61 |
| 2014/0077741 A1 * | 3/2014 | Kumagai | H02P 23/00 318/490 |
| 2014/0159734 A1 * | 6/2014 | Knill | G01R 31/3606 324/426 |
| 2014/0312818 A1 * | 10/2014 | Furuchi | H02P 6/14 318/400.29 |
| 2014/0354303 A1 * | 12/2014 | Harrison | H02M 3/3376 324/658 |
| 2014/0376279 A1 | 12/2014 | Park | |
| 2015/0015160 A1 * | 1/2015 | Angelin | H05B 33/0815 315/224 |
| 2015/0089253 A1 * | 3/2015 | Doering | G06F 1/26 713/300 |
| 2015/0146328 A1 * | 5/2015 | Mikami | H02H 7/1213 361/18 |
| 2015/0346758 A1 * | 12/2015 | Sakakibara | H02M 3/158 323/303 |
| 2016/0268899 A1 * | 9/2016 | Rader | H02M 3/156 |

FOREIGN PATENT DOCUMENTS

| | | |
|---|---|---|
| CN | 203445784 U | 2/2014 |
| GB | 2470214 A | 11/2010 |
| JP | 2002051540 A | 2/2002 |
| JP | 2013038251 A | 2/2013 |
| TW | 200909822 A | 3/2009 |

OTHER PUBLICATIONS

Pyakuryal, Sudeep et al., "Filter Design for AC to DC Converter", International Refereed Journal of Engineering and Science (IRJES), vol. 2, Issue 6, Jun. 2013, pp. 42-49.

* cited by examiner

SWITCHING VOLTAGE REGULATOR INPUT VOLTAGE AND CURRENT SENSING

TECHNICAL FIELD

The present application relates to switching voltage regulators, in particular sensing input voltage and current of switching voltage regulators.

BACKGROUND

Switching voltage regulators generate an output voltage from an input voltage and are implemented with active components such as a pulse width modulation controller (PWM), driver, power MOSFETs, and passive components such as inductors, transformers or coupled inductors, capacitors, and resistors. Controllers typically measure the output current and output voltage in order to regulate and monitor the output voltage. Measuring the input current and input voltage allow the controller to improve regulation and monitoring, as well as monitoring input power for voltage, current, and power constraints.

Knowledge of the regulator input current and voltage is required in some controllers for improved regulation algorithms and monitoring input power for voltage, current, and power constraints. Measuring the input current and voltage requires external and internal circuitry in the controller. Input voltage is an existing measurement for many conventional voltage regulators. Then, only input current must be known to obtain the input power of the power converter.

The input current can be either sensed or estimated. In the case of sensing, input voltage can be sensed directly by scaling down the voltage via a voltage divider. Input current can be sensed using an external amplifier. However, such an approach requires both a high-side shunt resistor and an amplifier. A lower complexity input current and voltage monitor is therefore desirable to minimize regulator complexity and cost.

SUMMARY

According to an embodiment of a voltage regulator, the voltage regulator comprises an input voltage terminal, a power stage configured to produce an output voltage from an input voltage at the input voltage terminal, a controller configured to control switching of the power stage, a shunt resistor connected in series between the input voltage terminal and the power stage, a first level shifting resistor connected in series between a first terminal of the shunt resistor and a first sense pin of the controller, and a second level shifting resistor connected in series between a second terminal of the shunt resistor and a second sense pin of the controller. The controller is configured to sense the input current of the regulator as a function of the voltage across the shunt resistor, as shifted down by the level shifting resistors and measured across the sense pins. The controller is configured to sense the input voltage of the regulator as a function of the current flowing through either one of the level shifting resistors, as measured at one of the sense pins.

According to an embodiment of a method of sensing input current and voltage of a voltage regulator that includes an input voltage terminal, a power stage configured to produce an output voltage from an input voltage at the input voltage terminal, a shunt resistor connected in series between the input voltage terminal and the power stage, a first level shifting resistor connected in series between a first terminal of the shunt resistor and a first sense pin of the controller, and a second level shifting resistor connected in series between a second terminal of the shunt resistor and a second sense pin of the controller, the method comprises: sensing the input current of the regulator as a function of the voltage across the shunt resistor, as shifted down by the level shifting resistors and measured across the sense pins; and sensing the input voltage of the regulator as a function of the current flowing through either one of the level shifting resistors, as measured at one of the sense pins.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein sense input current of a voltage regulator by adding a low ohmic high-side shunt resistor to the input power rail of the regulator, so that the voltage across the shunt resistor is proportional to the input current. Level shifting can be accomplished by adding two high ohmic series resistors to each terminal of the shunt resistor, and connecting the other terminals of the high ohmic series resistors to two sense (input) pins on the regulator controller. The regulator controller forces a current through the high ohmic series resistors such that the voltage across the controller sense (input) pins is dependent on the voltage across the shunt resistor, but level shifted to a lower voltage which does not exceed the maximum voltage permitted at the sense pins. The controller contains circuitry that senses (1) the input voltage as a function of the current through the two sense (input) pins and (2) the input current as a function of the voltage across the two sense (input) pins.

Figure 1:
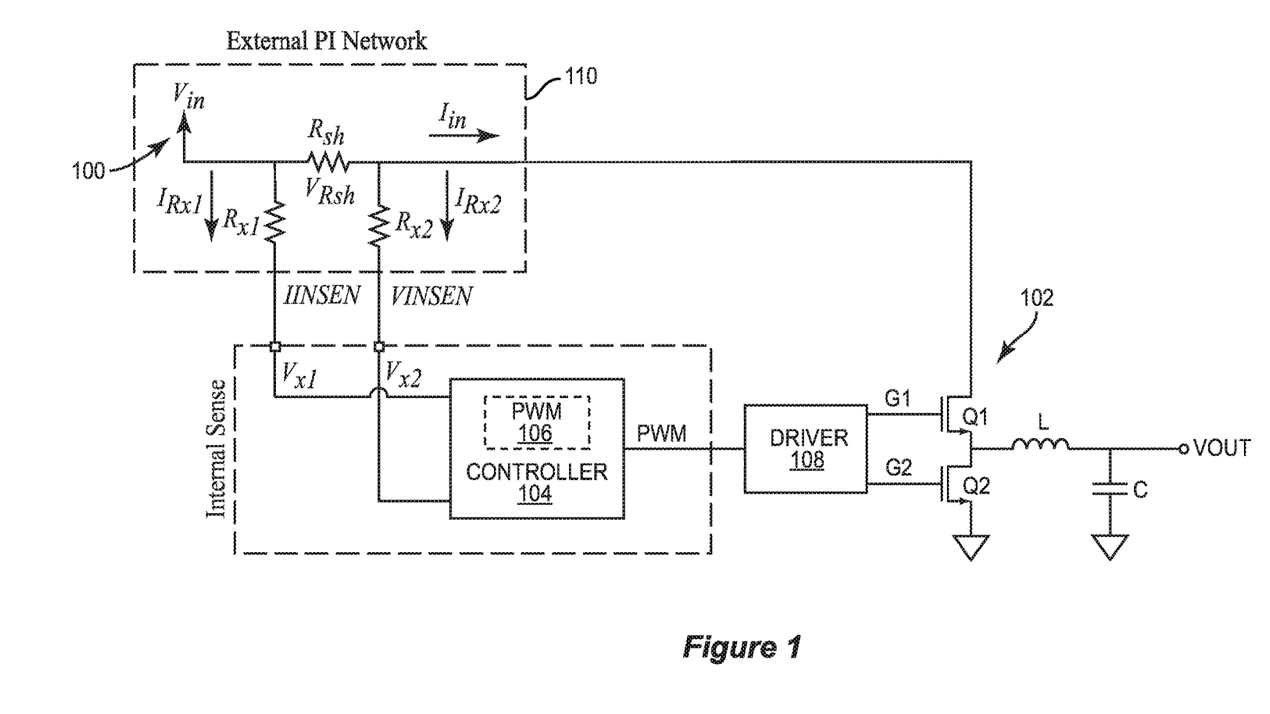
FIG. 1 illustrates a block diagram of an embodiment of a voltage regulator having a controller configured to sense input current and input voltage of the regulator.

FIG. 1 illustrates an embodiment of a voltage regulator. The voltage regulator comprises an input voltage terminal 100, a power stage 102 configured to produce an output voltage (Vout) from an input voltage (Vin) at the input voltage terminal 100, and a controller 104 such as a microcontroller, microprocessor, ASIC (application-specific integrated-circuit), etc. configured to control switching of the power stage 102. The power stage 102 is connected to an external load (not shown) through an inductor (L) and a capacitor (C) in FIG. 1. Alternatively, the power stage 102 can be coupled to the load through a transformer or coupled inductors. In each case, the power stage 102 has one or more phases coupled to the load. In the embodiment of FIG. 1, each phase includes a high-side transistor (Q1) and a low-side transistor (Q2) for coupling the power stage 102 to the load. The high-side transistor Q1 switchably connects the load to the input voltage rail (Vin) of the voltage regulator, and the corresponding low-side transistor Q2 switchably connects the load to ground at different periods. The power stage 102 is shown with one phase in FIG. 1 for ease of illustration. In general, the power stage 102 can include any desired number of phases including one phase (single-phase implementation) or more than one phase (multi-phase implementation). The load powered by the voltage regulator can be a high-performance integrated circuit such as a microprocessor, graphics processor, network processor, etc. or other type of integrated circuit requiring voltage regulation such as a POL (point-of-load).

The regulator controller 104 regulates the voltage (Vout) delivered to the load by the power stage 102, by adjusting the current delivered to the load. The controller 104 can include a pulse width modulator (PWM) unit 106 for switching the transistors Q1, Q2 of the power stage 102 via a corresponding PWM control signal (PWM) so that the power stage 102 sources or sinks current to the load. When the PWM control signal is at a logic level high, the high-side transistor Q1 is placed in a conductive state, the inductor current is sourced or sunk through the high-side transistor Q1, and the current through the inductor increases for the duration. This is generally referred to as the 'on-time' and the power stage 102 is considered to be 'turned on'. When the PWM control signal is at a logic level low, the corresponding low-side transistor Q2 is placed in a conductive state, current is sourced or sunk from the low-side transistor Q2, and the current through the inductor decreases for the duration. This is generally referred to as the 'off-time' and the power stage 102 is considered to be 'turned off'. When the PWM control signal is at a trivalent or high impedance logic level (the PWM control signal is neither high nor low), both the high-side and the low-side transistors Q1, Q2 are placed in a non-conductive state, current is sourced or sunk through either the low-side or high side transistor body diodes, and the magnitude of the current through the inductor decreases towards zero. This is generally referred to as the 'HiZ-time' or 'inactive time' and the power stage 102 is considered to be in 'High Z' or inactive.

In DCM (discontinuous conduction mode), the low-side transistor Q2 is not allowed to be conductive when the inductor current reaches zero. The cycle then consists of an on-time, followed by an off-time, followed by a HiZ time. During the HiZ time, the inductor current approaches zero and does not change for the duration of the cycle once it is zero. As a result, the inductor current does reach zero during part of the switching cycle in DCM. In CCM (continuous conduction mode), the inductor current does not stop at zero between switching cycles. That is in DCM, the inductor current is always positive or zero and in CCM the inductor current can be positive or negative but does not stay at zero. The inductor current can cross zero and go negative e.g. at no-load, and the voltage regulator can operate in CCM where the triangular inductor current is centered at zero.

In either CCM or DCM, driver circuitry 108 provides respective gate drive signals G1, G2 to the gates of the high-side and low-side transistors Q1, Q2 of the power stage 102 in response to the PWM control signals provided by the controller 104. The activation state of each power stage phase and the duty cycle of the corresponding high-side and low-side transistors Q1, Q2 are determined at least in part based on the output voltage (Vout) applied to the load so that the voltage regulator can react as quickly and reliably as possible to changing load conditions.

The controller 104 can manage changes from one reference voltage to another. The controller 104 can also determine errors between the output voltage (Vout) and a reference voltage, and convert the error voltage into a digital representation provided to the PWM unit 106 of the controller 104 for modifying the switching cycle of power stage transistors Q1, Q2 e.g. by adjusting the duty cycle. Such voltage regulation functions are standard in typical digitally-controlled switching voltage regulators, and therefore no further explanation is given in this regard.

In addition to regulating the voltage delivered to the load, the controller 104 also senses the input voltage and input current internally without the use of external amplifiers and without the controller 104 having to connect to voltages exceeding its maximum voltage ratings, even though the regulator input voltage rail Vin (e.g. 12V) may be significantly higher than the internal supply rail (e.g. 3.3 V) of the controller 104. To this end, the controller 104 measures both the input voltage and input current using a network of resistances 110.

The network of resistances 110 includes a low ohmic shunt resistor (Rsh) and a pair of high ohmic level shifting series resistors (Rx1, Rx2). The voltage ($V_{Rsh}$) across the shunt resistor Rsh is a function or representation of the input current (Iin). Each level shifting resistor Rx1, Rx2 connects one terminal of the shunt resistor Rsh to a sense (input) pin (IINSEN, VINSEN) of the controller 104, to allow the controller 104 to measure the input voltage and input current. In one embodiment, the controller 104 measures the input voltage and input current by providing a bias current to the sense pins IINSEN, VINSEN. The level shifting resistors Rx1, Rx2 allow the high voltage input current to be level shifted to an appropriate input voltage to the controller 104. This way, the maximum voltage permitted at the sense pins IINSEN, VINSEN is not exceeded even though the regulator input voltage rail is higher than the maximum voltage of the sense pins. For example, the input voltage may be 12V and the maximum voltage permitted at the sense pins IINSEN, VINSEN may be 1.5V to 2V. The level shifting resistors Rx1, Rx2 draw a current to drop the input voltage Vin to a voltage level no greater than 1.5V to 2V, but still provide the voltage $V_{Rsh}$ across the shunt resistor Rsh at the sense pins IINSEN, VINSEN of the controller 104 because the level shifting resistors Rx1, Rx2 are matched.

The shunt resistor Rsh included in the network of resistances 110 preferably has a resistance in the milli to micro Ohm range. The shunt resistor Rsh is lossy in that it lowers system efficiency by slightly reducing the input voltage rail for the power stage 102 as given by $Power_{loss} = Iin^2 * R_{sh}$. However, by using a shunt resistor Rsh having a resistance in the milli to micro Ohm range, the voltage drop ($V_{Rsh}$)

across the input voltage rail Vin of the regulator is minimized and therefore the power loss (Power$_{loss}$) also is minimized. For example, the voltage drop V$_{Rsh}$ across the shunt resistor Rsh is about 5 mV for a shunt resistance in the micro Ohm range.

In contrast to the shunt resistor Rsh, the level shifting resistors Rx1, Rx2 should be high ohmic to minimize power loss from the input voltage rail Vin as given by Power$_{loss}$= (Vin−Vinsense)$^2$/R$_x$ where Vinsense is the voltage measured at one of the controller sense pins IINSEN, VINSEN and Rx is the level shifting resistor that connects that sense pin to a terminal of the shunt resistor Rsh. Vinsense can be measured via either level shifting resistor Rx1, Rx2. The level shifting resistors Rx1, Rx2 are well matched to each other (i.e. highly precise) and have a resistance which is orders of magnitude higher than that of the shunt resistor Rsh e.g. preferably in the mega Ohm range. Each of the resistors Rsh, Rx1, Rx2 included in the network of resistances 110 can comprise one or more individual resistors.

Figure 2:
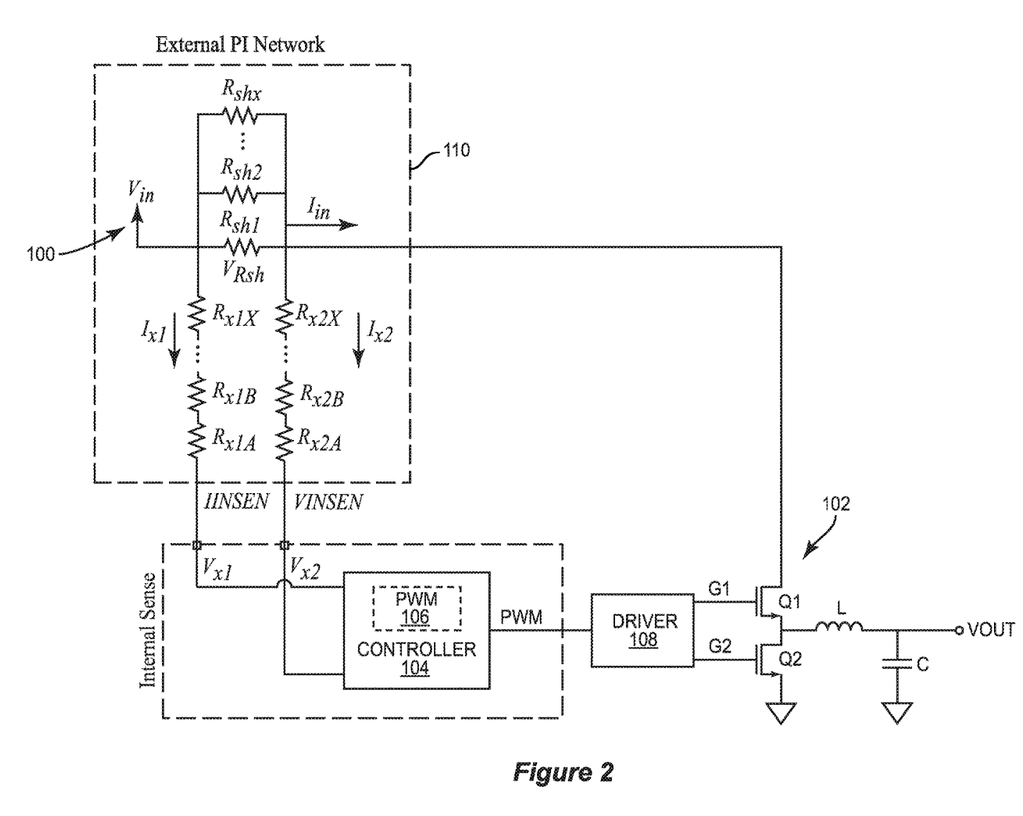
FIG. 2 illustrates a block diagram of another embodiment of a voltage regulator having a controller configured to sense input current and input voltage of the regulator.

FIG. 2 illustrates an embodiment of the voltage regulator in which the resistors Rsh, Rx1, Rx2 included in the network of resistances 110 each comprise more than one physical resistor. More particularly, the shunt resistor Rsh is physically implemented as a plurality of low ohmic discrete resistors Rsh1, Rsh2, . . . , Rshx connected in parallel. Such an arrangement is beneficial for handling large input currents Iin. The first level shifting resistor Rx1 is physically implemented as a plurality of high ohmic discrete resistors Rx1A, Rx1B, . . . , Rx1X connected in series between the shunt resistor terminal connected to the input voltage terminal 100 of the regulator and the IINSEN sense pin of the controller 104. In a similar way, the second level shifting resistor Rx2 is physically implemented as a plurality of high ohmic discrete resistors Rx2A, Rx2B, . . . , Rx2X connected in series between the shunt resistor terminal connected to the power stage 102 and the VINSEN sense pin of the controller 104.

By providing the network of resistances 110 described above and illustrated in FIGS. 1 and 2, the controller 104 can sense the input current (Iin) of the regulator as a function of the voltage V$_{Rsh}$ across the shunt resistor as given by Iin=f(V$_{Rsh}$), as shifted down by the level shifting resistors Rx1, Rx2 and measured across the sense pins IINSEN, VINSEN as a function of Vinsense=Vx1−Vx2. The controller 104 also can sense the input voltage Vin of the regulator as a function of the current (I$_{Rx1}$, I$_{Rx2}$) flowing through either one of the level shifting resistors Rx1, Rx2 as given by Vin=f(I$_{RxN}$), as measured at the corresponding sense pin IINSEN, VINSEN.

Figure 3:
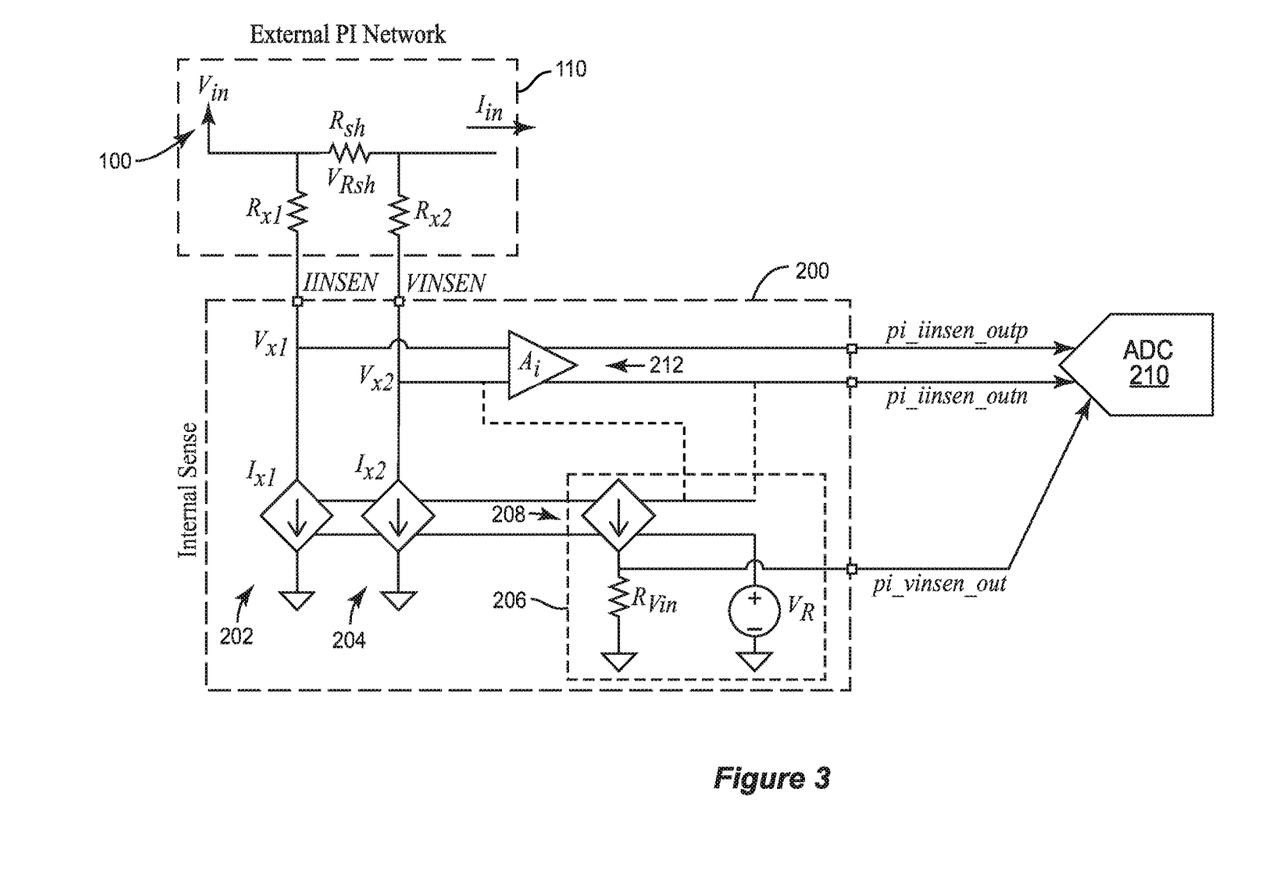
FIG. 3 illustrates a block diagram of an embodiment of input voltage and input current sense circuitry internal to the regulator controller.

FIG. 3 illustrates an embodiment of the input voltage and input current sense circuitry 200 internal to the regulator controller 104. According to this embodiment, the controller comprises matched current mirrors 202, 204 each of which sinks current (Ix1, Ix2) through the corresponding level shifting resistor Rx1, Rx2 such that the voltage drop (Vx1, Vx2) across the level shifting resistors Rx1, Rx2 is substantially the same and the voltage across the sense pins (Vinsense=Vx1−Vx2) substantially matches the voltage (V$_{Rsh}$) across the shunt resistor Rsh. The controller 104 can sense the input current by using the matched current sources 202, 204 at both input pins IINSEN, VINSEN such that Ix1=Ix2. The voltage drop across both external level shifting resistors Rx1, Rx2 is the same such that the voltage across the controller sense pins IINSENSE, VINSENSE is equal to the voltage drop across the shunt resistor as given by V$_{Rsh}$=V$_{x1}$−V$_{x2}$.

The input voltage can be sensed as a function of the input current Ix1, Ix2 at one of the controller sense pins IINSENSE, VINSENSE. According to one embodiment, the controller 104 comprises a circuit 206 such as a feedback amplifier for regulating the voltage (Vx1, Vx2) at one of the sense pins IINSENSE, VINSENSE such that the voltage at this sense pin remains constant over a range of voltage levels at the input voltage terminal 100 and the current (Ix1, Ix2) through this sense pin is a function of the input voltage Vin. In more detail, the voltage (Vx1, Vx2) across the level shifting resistors Rx1, Rx2 should be matched, and therefore well-matched current mirrors 202, 204 are used in this embodiment. Also, the input voltage Vin should be level shifted by the correct amount so that the maximum voltage of the controller sense pins IINSEN, VINSEN is not exceeded. As such, the feedback amplifier 206 forces the current (Ix1, Ix2) through one of the level shifting resistors Rx1, Rx2 such that the voltage (Vx1, Vx2) at the corresponding sense pin equals a reference V$_R$ of the feedback amplifier 206. The feedback amplifier 206 can include a current mirror 208 and provide the sensed input voltage (pi_vinsen_out) through a current-to-voltage conversion at one of the controller sense pins IINSEN, VINSEN.

The feedback amplifier 206 can sense the voltage at either the IINSEN pin, the VINSEN pin, or a combination of the two voltages, such that the currents 202 and 204 are adjusted so that the voltages at IINSENS and VINSENS are effectively virtual grounds and match the reference (target) voltage V$_R$. For example according to a first feedback connection configuration illustrated in FIG. 3, the feedback amplifier 206 regulates the voltage (Vx2) at the sense pin VINSEN to the reference voltage V$_R$ as given by A$_v$(V$_R$−Vx2). Alternatively, the common mode loop of amplifier 212 can be used to set the common mode of IINSEN and VINSEN such that the common mode equals the target V$_R$. For example according to a second feedback connection configuration illustrated in FIG. 3, the feedback amplifier 206 regulates the voltage (pi_iinsen_outn) at one output of the amplifier 212 to the reference voltage V$_R$ as given by A$_v$(V$_R$−pi_iinsen_outn). The dashed lines in FIGS. 3-6 and 8 between the input and output of the amplifier 212 and the feedback amplifier 206 illustrate the feedback connections for the alternative voltage sensing options described above. As such, the sense amplifier 212 can be placed before or after the feedback node of the feedback amplifier 206 such that the feedback node can be connected to either Vx1 or Vx2, or pi_iinsen_outp or pi_iinsen_outn as shown in FIGS. 3-6 and 8.

According to the embodiment shown in FIG. 3, the first terminal of the shunt resistor Rsh is connected to the input voltage terminal 100 of the regulator, the second terminal of the shunt resistor Rsh is connected to the power stage 102 and the regulator sense circuitry 200 regulates the voltage at sense pin VINSENSE such that the voltage Vx2 at this sense pin remains constant over a range of voltage levels at the input voltage terminal 100 and the current Ix2 through sense pin VINSEN is a function of the input voltage Vin. That is, the feedback amplifier 206 forces the current Ix2 through the second level shifting resistor Rx2 such that the voltage Vx2 at the controller sense pin VINSEN equals the reference V$_R$ of the feedback amplifier 206. The current Ix2 drawn at sense pin VINSEN to force Vx2=V$_R$ represents the input voltage of the regulator and the feedback amplifier 206 provides the sensed input voltage (pi_vinsen_out) through a current-to-voltage conversion at the controller sense pin VINSEN.

Figure 4:
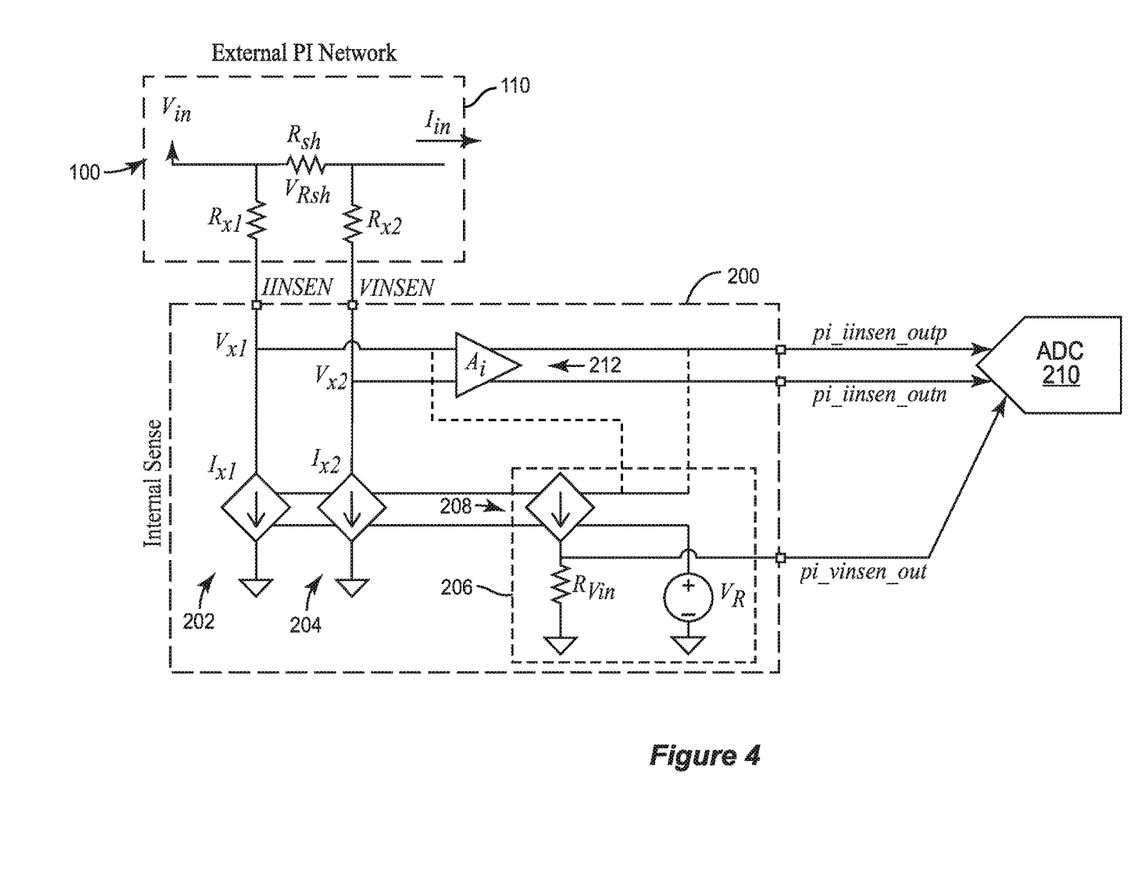
FIG. 4 illustrates a block diagram of another embodiment of input voltage and input current sense circuitry internal to the regulator controller.

FIG. 4 illustrates another embodiment of the input voltage and input current sense circuitry 200 internal to the regulator controller 104. The embodiment shown in FIG. 4 is similar to the embodiment shown in FIG. 3. Different however, the regulator sense circuitry 200 regulates the voltage at sense pin IINSEN instead of sense pin VINSEN such that the voltage Vx1 at this sense pin remains constant over a range of voltage levels at the input voltage terminal 100 and the current Ix1 through sense pin IINSEN is a function of the input voltage Vin. Similar to the embodiment described above and shown in FIG. 3, the feedback amplifier 206 forces current Ix1 through the first level shifting resistor Rx1 such that the voltage Vx1 at the controller sense pin IINSEN equals the reference $V_R$ of the feedback amplifier 206. The current Ix1 drawn at sense pin IINSEN to force Vx1=$V_R$ represents the input voltage (pi_vinsen_out) of the regulator in this case. The embodiment shown in FIG. 3 provides a more accurate measure of the actual input voltage seen by the power stage 102, since the input voltage is sensed between the shunt resistor Rsh and the power stage 102 instead of between the shunt resistor Rsh and the input voltage terminal 100, and therefore accounts for the small voltage $V_{Rsh}$ drop across the shunt resistor Rsh.

According to both embodiments shown in FIGS. 3 and 4, the input voltage and input current sense circuitry 200 internal to the regulator controller 104 can also include an analog-to-digital converter (ADC) 210 for digitizing a representation of the current through the sense pin VINSEN, IINSEN whose voltage (Vx2, Vx1) is regulated at a constant level ($V_R$) by the feedback amplifier 206 as described above. This same or different ADC 210 can be used to digitize a representation of the voltages at both sense pins IINSEN, VINSEN of the controller 104. As previously described herein, the difference between the sense pin voltage (Vx1−Vx2) represents the input current. The controller 104 can further include an amplifier 212 configured to amplify the difference between the voltages at the sense pins IINSEN, VINSEN. According to this embodiment, the ADC 210 digitizes the differential outputs (pi_iinsen_outp, pi_iinsen_outn) of the amplifier 212 to yield a digital representation of the measured input current.

Figure 5:
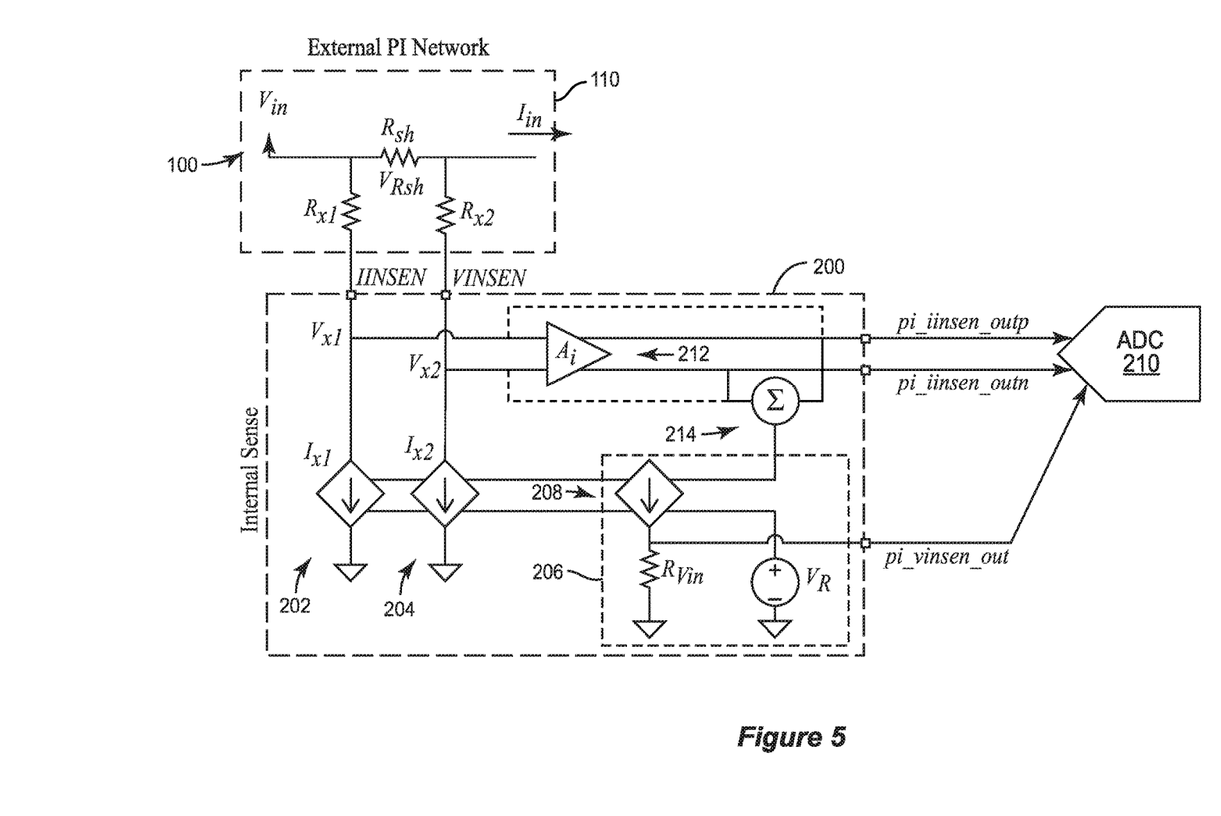
FIG. 5 illustrates a block diagram of yet another embodiment of input voltage and input current sense circuitry internal to the regulator controller.

FIG. 5 illustrates yet another embodiment of the input voltage and input current sense circuitry 200 internal to the regulator controller 104. According to this embodiment, the ADC 210 digitizes a representation of a function of the voltages at the sense pins IINSEN, VINSEN whose voltages (Vx2, Vx1) are regulated by the feedback amplifier 206. The function can be an average, sum or weighted sum. In FIG. 5, the function is a sum 214 of the voltages as given by $A_v(f(Vx1+Vx2)-V_R)$. As an alternative, a function of the output voltages of the amplifier 212 can be regulated by the feedback amplifier 208, such that the common-mode of the output voltages of the amplifier 212 are regulated by the feedback amplifier 208 as given by $A_v(f(pi\_iinsen\_outp+pi\_iinsen\_outn)-V_R)$. According to this alternate embodiment, the feedback amplifier 206 regulates some function (e.g. average, sum or weighted sum) of the output voltages pi_iinsen_outp, pi_iinsen_outn of the amplifier 212. The dashed lines in FIG. 5 between the input and output of the amplifier 212 and the summing logic 214 illustrate the connections for the alterative voltage sensing options described above.

Accuracy of the input voltage and input current measurement techniques described heretofore suffer in the presence of mismatch e.g. between the level shifting resistors Rx1, Rx2, between the current mirrors 202, 204, at the amplifier 212, at the ADC 210, etc. The offsets caused by such mismatches decrease the accuracy of the input current and input voltage measurements if left unmitigated, and these offsets can become more pronounced over time. The regulator controller 104 can be configured to reduce the mismatches. For example with regard to the current mirrors 202, 204, even very precise current mirrors can have some offset but still be considered matched. The controller 104 can be configured to average out the resulting offset between the current sunk by the current mirrors 202, 204. In this regard, the controller 104 can include a calibration circuit which forces the current mirrors 202, 204 to match as described in more detail later herein.

Figure 6:
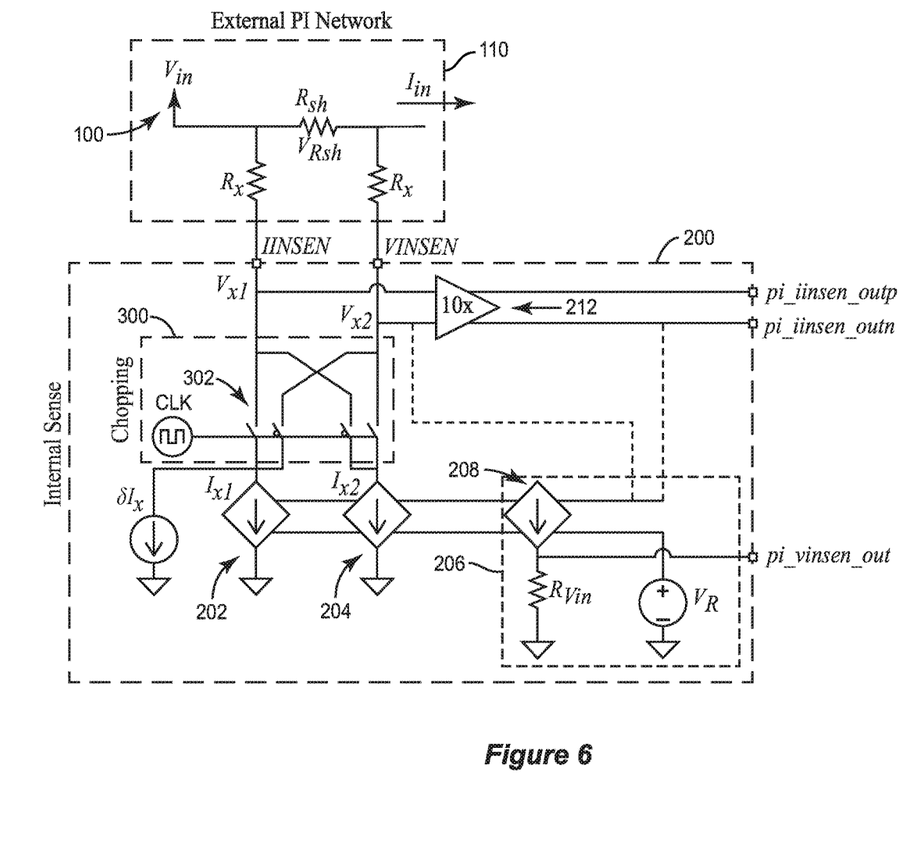
FIG. 6 illustrates a block diagram of an embodiment of a current mirror chopping circuit of the regulator controller.

FIG. 6 illustrates another embodiment in which the regulator controller 104 includes a chopping circuit 300 for averaging out the offset between the current Ix1, Ix2 sunk by the current mirrors 202, 204. The input current Iin=(Vx1−Vx2)/Rsh. Current mirror mismatch introduces an error δIx proportional to the current through the mismatched mirror 202, 204. The error δIx leads to a measurement error as given by Ierr=δIx*Rx/Rsh. Since the input voltage range is small due to the use of a small ohmic shunt resistor Rsh, a small mismatch can lead to a large error. To reduce this error, the chopping circuit 300 includes clocked switches for alternatingly coupling the current mirrors 202, 204 to each of the level shifting resistors Rx1, Rx2 such that effective current measurements for the level shifting resistors RX1, Rx2 average out offset between the current Ix1, Ix2 sunk by the current mirrors 202, 204. Additional chopping circuits can be provided to average out mismatch offsets in other parts of the input voltage and input current sense circuitry 200 internal to the regulator controller 104.

Figure 7:
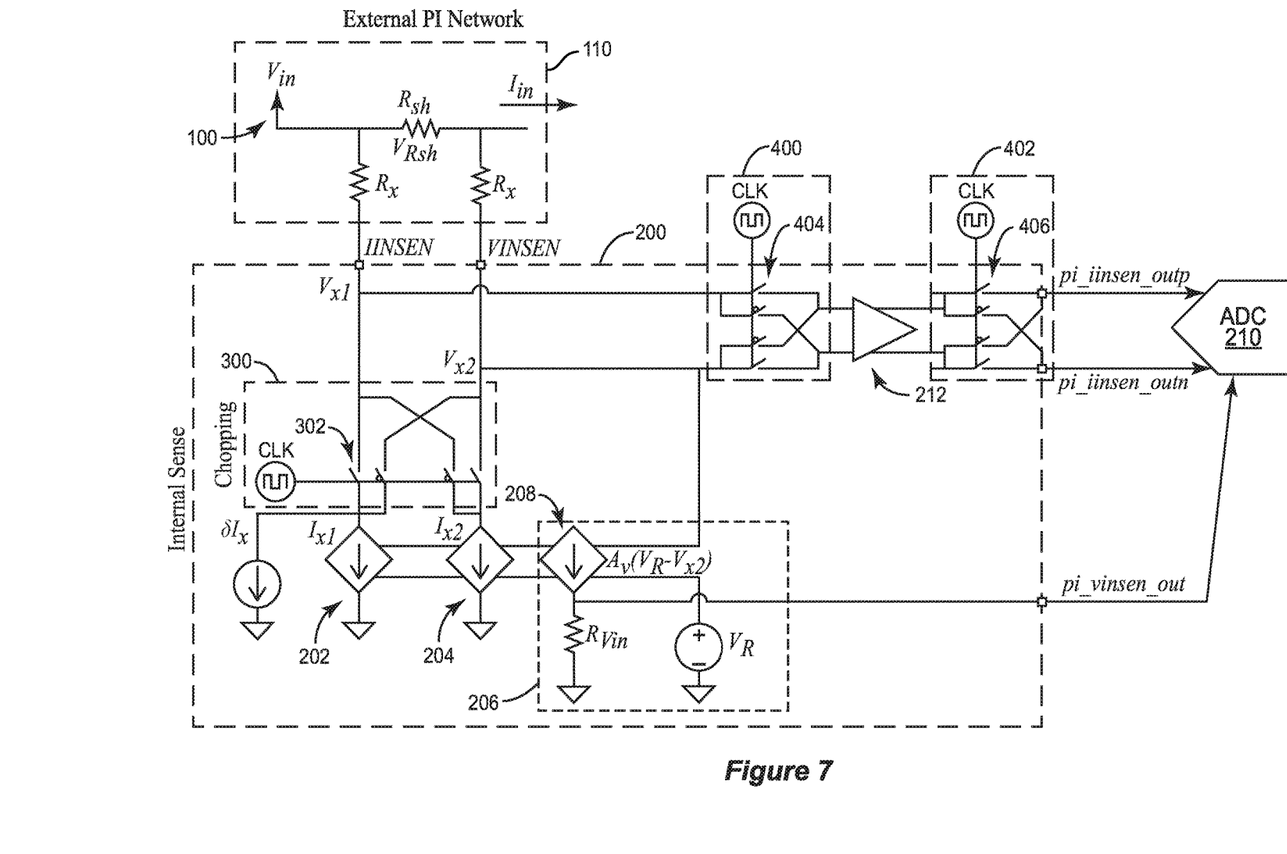
FIG. 7 illustrates a block diagram of an embodiment of current mirror, amplifier and ADC chopping circuits of the regulator controller.

FIG. 7 illustrates an embodiment of the regulator controller 104 in which additional chopping circuits 400, 402 are provided for averaging out mismatch offsets in other parts of the input voltage and input current sense circuitry 200 internal to the controller 104. The voltage ($V_{Rsh}$) across the shunt resistor Rsh is amplified by an amplifier 212 and digitized by an ADC 210. The amplifier 212 and ADC 210 contribute offsets that can be removed by chopping the input to the amplifier 212 and the input to the ADC 212, respectively. A first additional chopping 400 includes clocked switches 404 for alternatingly coupling the sense pins VINSEN, IINSEN to each input of the amplifier 212 to average out mismatch offset caused by the level shifting resistors Rx1, Rx2. A second additional chopping circuit 402 includes clocked switches 406 for alternatingly coupling the differential outputs (pi_iinsen_outp, pi_iinsen_outn) of the amplifier 212 to the ADC 210 to average out mismatch offset caused by the amplifier 212. The first and second additional chopping circuits 400, 402 can chop the respective incoming amplifier and ADC current signals at different frequencies so that all four current signal combinations are averaged together (left side (Ix1), right side (Ix2), positive differential amplifier output, and negative differential amplifier output).

Mismatch in the level shifting resistors Rx1, Rx2 leads to an offset in the measured current as given by $$I_{err} = \frac{\Delta R_x * I_x}{R_{sh}}$$

where Rx is the ideal matched resistance for the level shifting resistors Rx1, Rx2 and ΔRx is the mismatch.

Figure 8:
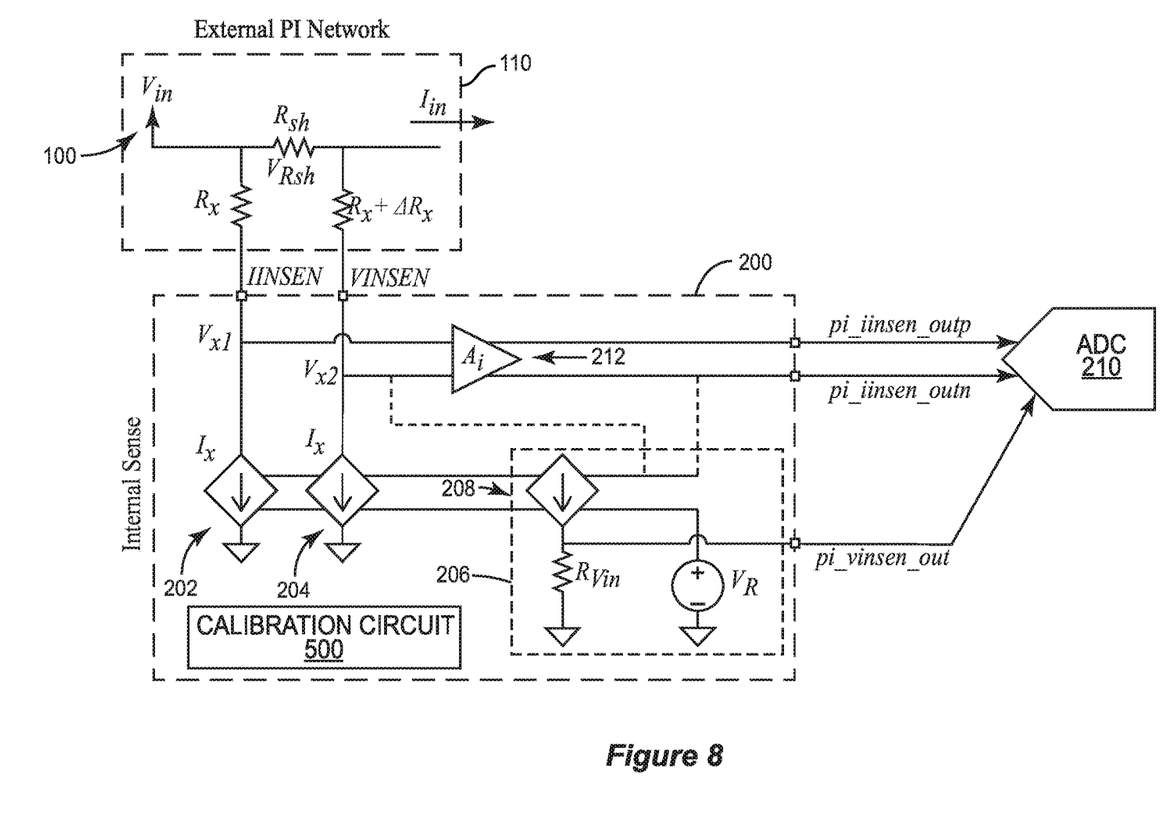
FIG. 8 illustrates a block diagram of an embodiment of a calibration circuit of the regulator controller.

FIG. 8 illustrates an embodiment of the regulator controller 104 in which the controller 104 includes a calibration circuit 500 for measuring the voltage (Vx2−Vx1) across the sense pins VINSEN, IINSEN when the input current Iin is expected to be near zero e.g. each time the regulator powers-up, each time the regulator receives an output enable signal, or in a calibration mode. When Iin=0, $V_{Rsh}$=0 and the current measured by the regulator 104 should be close to zero if there are no mismatches. Voltages Vx1 and Vx2 are a function of the Rx mismatch (ΔRx), current mirror mismatch, amplifier mismatch and the ADC mismatch. If there was no mismatch, then the ADC output would be zero when Iin=0. As such, measuring the input voltage and input current when Iin is known to be zero yields information about the collective mismatch. The calibrated value generated by the calibration circuit 500 indicates the amount of total mismatch. The controller 104 can use the calibrated value in adjusting the input voltage and current sensing during operation by applying it as an adjustment value to the input voltage and input current measurements.

Figure 9:
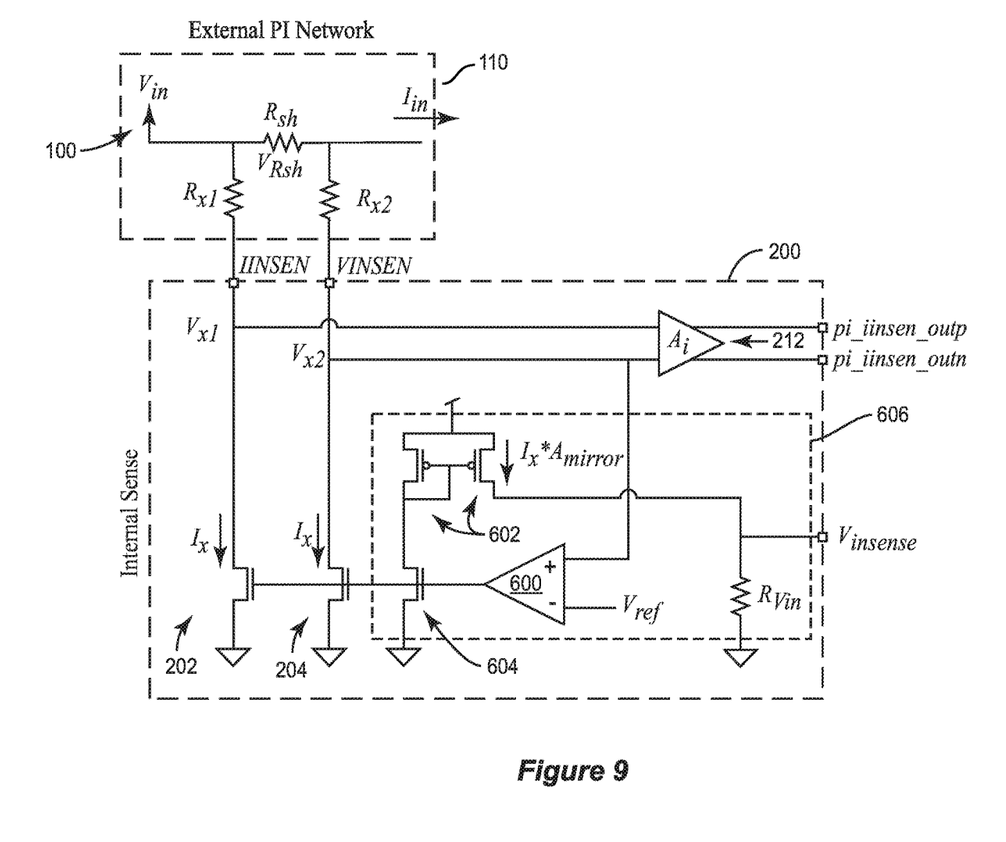
FIG. 9 illustrates a block diagram of an embodiment of a current mirror of the regulator controller.

FIG. 9 illustrates an embodiment of the regulator controller 104 in which the current mirrors 202, 204 are implemented using n-type FETs driven by an amplifier 600 coupled to pin VINSEN that sets voltage Vx2 to Vref. P-type mirrors 602 coupled to an additional n-type FET 604 form an input voltage sensor 606 which is used for I-V conversion to mirror the input current onto a resistor $R_{Vin}$, to yield the measured input voltage as given by $$V_{insense} = (V_{in} - V_{ref}) * A_{mirror} * \frac{R_{vin}}{R_{x2} + R_{sh}}$$

where $A_{mirror}$ is the current gain of the P-type mirrors 602.

Figure 10:
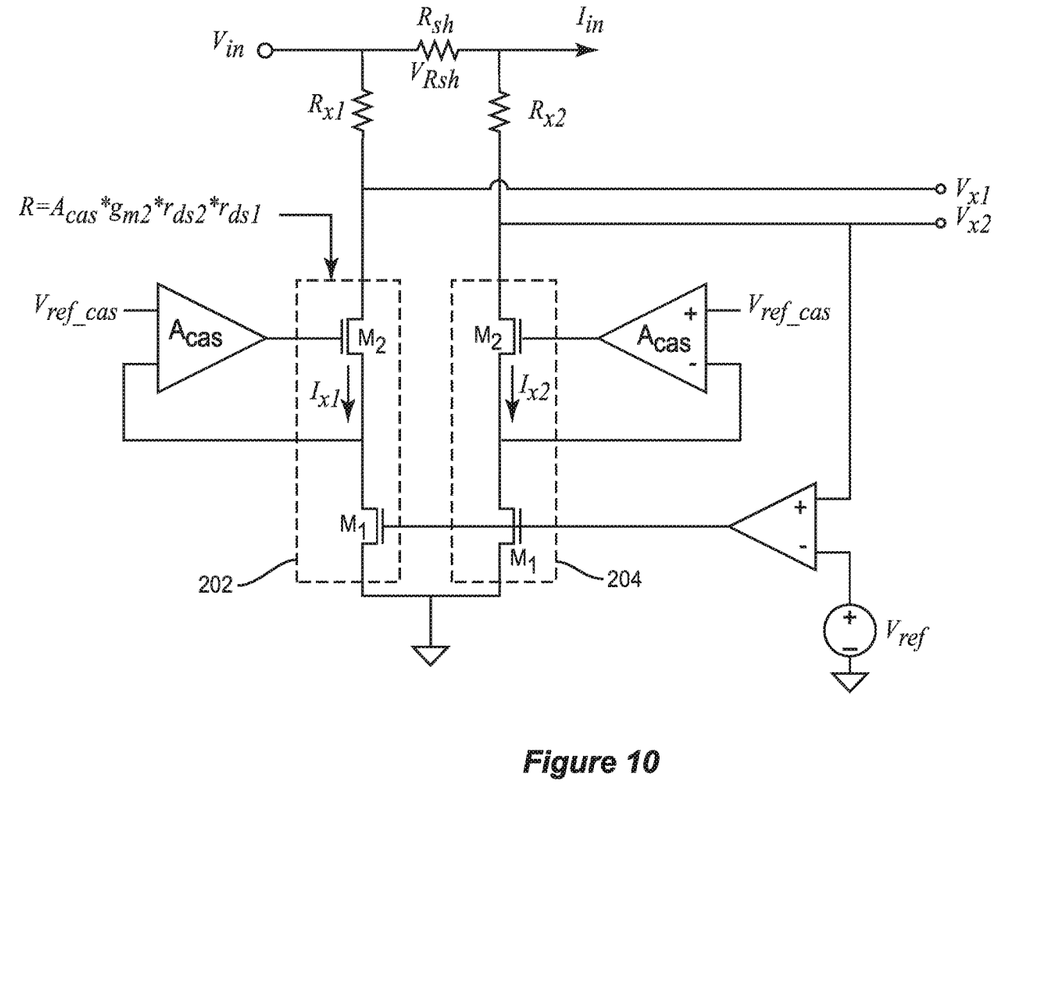
FIG. 10 illustrates a block diagram of an embodiment of a current mirror of the regulator controller which has active cascoding.

FIG. 10 illustrates an embodiment of the regulator controller 104 in which the current mirrors 202, 204 have active cascoding in order to boost the output impedance R of the current mirrors 202, 204 for good matching. With active cascoding, the drain voltage of transistor M2 is regulated by amplifier Acas for both current mirrors 202, 204 to provide better matching. The output impedance R of each current mirror 202, 204 is given by R=Acas*gm2*rds2*rds1 where Acas is the gain of the corresponding amplifier, gm2 is the transconductance of the corresponding transistor M2, rds2 is the on-state resistance of the corresponding transistor M2 and rds1 is the on-state resistance of the corresponding transistor M1. The current mirrors 202, 204 can be chopped as previously described herein to further improve the matching.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage regulator, comprising:
an input voltage terminal;
a power stage configured to produce an output voltage from an input voltage at the input voltage terminal;
a controller configured to control switching of the power stage;
a shunt resistor connected in series between the input voltage terminal and the power stage;
a first level shifting resistor connected in series between a first terminal of the shunt resistor and a first sense pin of the controller; and
a second level shifting resistor connected in series between a second terminal of the shunt resistor and a second sense pin of the controller;
wherein the controller is configured to sense the input current of the regulator as a function of the voltage across the shunt resistor, as shifted down by the level shifting resistors and measured across the sense pins,
wherein the controller is configured to sense the input voltage of the regulator as a function of the current flowing through either one of the level shifting resistors, as measured at one of the sense pins,
wherein the controller comprises a circuit configured to regulate the voltage at one of the sense pins such that the voltage at this sense pin remains constant over a range of voltage levels at the input voltage terminal and the current through this sense pin is a function of the input voltage.

2. The voltage regulator of claim 1, wherein the level shifting resistors are configured to shift the input voltage to a level equal or lower than a maximum voltage permitted at the sense pins.

3. The voltage regulator of claim 1, wherein the shunt resistor comprises a plurality of discrete resistors connected in parallel.

4. The voltage regulator of claim 1, wherein the first level shifting resistor comprises a first plurality of discrete resistors connected in series and the second level shifting resistor comprises a second plurality of discrete resistors connected in series.

5. The voltage regulator of claim 1, wherein the controller comprises matched current mirrors configured to sink current through the level shifting resistors such that the voltage drop across the level shifting resistors is substantially the same and the voltage across the sense pins substantially matches the voltage across the shunt resistor.

6. The voltage regulator of claim 5, wherein the controller is configured to average out offset between the current sunk by the matched current mirrors.

7. The voltage regulator of claim 6, wherein the controller comprises a chopping circuit configured to alternatingly couple the matched current mirrors to each of the level shifting resistors such that effective current measurements for the level shifting resistors average out offset between the current sunk by the matched current mirrors.

8. The voltage regulator of claim 5, wherein the matched current mirrors have active cascoding.

9. The voltage regulator of claim 1, wherein the first terminal of the shunt resistor is connected to the input voltage terminal, the second terminal of the shunt resistor is connected to the power stage, and the circuit is configured to regulate the voltage at the second sense pin such that the voltage at the second sense pin remains constant over a range of voltage levels at the input voltage terminal and the current through the second sense pin is a function of the input voltage.

10. The voltage regulator of claim 1, wherein the controller comprises an analog-to-digital converter configured to digitize a representation of the current through the sense pin whose voltage is regulated at a constant level by the circuit.

11. The voltage regulator of claim 1, wherein the controller comprises an analog-to-digital converter configured to digitize a representation of a function of the currents through the sense pins, the function being an average, sum or weighted sum.

12. The voltage regulator of claim 1, wherein the controller comprises an analog-to-digital converter configured to digitize a representation of the current difference between the sense pins.

13. The voltage regulator of claim 1, wherein the controller comprises a current mirror configured to provide the sensed input voltage through a current to voltage conversion at one of the sense pins.

14. The voltage regulator of claim 1, wherein the controller comprises an amplifier configured to amplify the difference between the currents through the sense pins and an analog-to-digital converter configured to digitize the output of the amplifier.

15. The voltage regulator of claim 14, wherein the controller comprises a chopping circuit configured to alternatingly couple the sense pins to each input of the amplifier.

16. The voltage regulator of claim 15, wherein the controller comprises an additional chopping circuit configured to alternatingly couple the differential outputs of the amplifier to the analog-to-digital converter.

17. The voltage regulator of claim 14, wherein the controller comprises a chopping circuit configured to alternatingly couple the differential outputs of the amplifier to the analog-to-digital converter.

18. The voltage regulator of claim 1, wherein the controller comprises a calibration circuit configured to measure the voltage across the sense pins when the input current is expected to be near zero and produce a calibrated value which indicates mismatch between the level shifting resistors, and to use the calibrated value in adjusting the input voltage and current sensing during operation.

19. A method of sensing input current and voltage of a voltage regulator that includes an input voltage terminal, a power stage for producing an output voltage from an input voltage at the input voltage terminal, a shunt resistor connected in series between the input voltage terminal and the power stage, a first level shifting resistor connected in series between a first terminal of the shunt resistor and a first sense pin of a controller, and a second level shifting resistor connected in series between a second terminal of the shunt resistor and a second sense pin of the controller, the method comprising:
regulating the voltage at one of the sense pins such that the voltage at this sense pin remains constant over a range of voltage levels at the input voltage terminal and the current through this sense pin is a function of the input voltage;
sensing the input current of the regulator as a function of the voltage across the shunt resistor, as shifted down by the level shifting resistors and measured across the sense pins; and
sensing the input voltage of the regulator as a function of the current flowing through either one of the level shifting resistors, as measured at one of the sense pins.

20. A voltage regulator, comprising:
an input voltage terminal;
a power stage configured to produce an output voltage from an input voltage at the input voltage terminal;
a controller configured to control switching of the power stage;
a shunt resistor connected in series between the input voltage terminal and the power stage;
a first level shifting resistor connected in series between a first terminal of the shunt resistor and a first sense pin of the controller; and
a second level shifting resistor connected in series between a second terminal of the shunt resistor and a second sense pin of the controller;
wherein the controller is configured to sense the input current of the regulator as a function of the voltage across the shunt resistor, as shifted down by the level shifting resistors and measured across the sense pins,
wherein the controller comprises matched current mirrors configured to sink current through the level shifting resistors such that the voltage drop across the level shifting resistors is substantially the same and the voltage across the sense pins substantially matches the voltage across the shunt resistor, and wherein the controller is configured to average out offset between the current sunk by the matched current mirrors, and
wherein the controller is configured to sense the input voltage of the regulator as a function of the current flowing through either one of the level shifting resistors, as measured at one of the sense pins.

21. A voltage regulator, comprising:
an input voltage terminal;
a power stage configured to produce an output voltage from an input voltage at the input voltage terminal;
a controller configured to control switching of the power stage;
a shunt resistor connected in series between the input voltage terminal and the power stage;
a first level shifting resistor connected in series between a first terminal of the shunt resistor and a first sense pin of the controller; and
a second level shifting resistor connected in series between a second terminal of the shunt resistor and a second sense pin of the controller;
wherein the controller is configured to sense the input current of the regulator as a function of the voltage across the shunt resistor, as shifted down by the level shifting resistors and measured across the sense pins,
wherein the controller comprises an amplifier configured to amplify the difference between the sensed currents through the sense pins, an analog-to-digital converter configured to digitize an output of the amplifier, and a chopping circuit configured to alternatingly couple the sense pins to each input of the amplifier,
wherein the controller is configured to sense the input voltage of the regulator as a function of the current flowing through either one of the level shifting resistors, as measured at one of the sense pins.

22. A voltage regulator, comprising:
an input voltage terminal;
a power stage configured to produce an output voltage from an input voltage at the input voltage terminal;
a controller configured to control switching of the power stage;
a shunt resistor connected in series between the input voltage terminal and the power stage;
a first level shifting resistor connected in series between a first terminal of the shunt resistor and a first sense pin of the controller; and a second level shifting resistor connected in series between a second terminal of the shunt resistor and a second sense pin of the controller;

wherein the controller is configured to sense the input current of the regulator as a function of the voltage across the shunt resistor, as shifted down by the level shifting resistors and measured across the sense pins, wherein the controller comprises an amplifier configured to amplify the difference between the sensed currents through the sense pins, an analog-to-digital converter configured to digitize differential outputs of the amplifier, and a chopping circuit configured to alternatingly couple the differential outputs of the amplifier to the analog-to-digital converter, wherein the controller is configured to sense the input voltage of the regulator as a function of the current flowing through either one of the level shifting resistors, as measured at one of the sense pins.

23. A voltage regulator, comprising:
an input voltage terminal;
a power stage configured to produce an output voltage from an input voltage at the input voltage terminal;
a controller configured to control switching of the power stage;
a shunt resistor connected in series between the input voltage terminal and the power stage;
a first level shifting resistor connected in series between a first terminal of the shunt resistor and a first sense pin of the controller; and
a second level shifting resistor connected in series between a second terminal of the shunt resistor and a second sense pin of the controller;

wherein the controller is configured to sense the input current of the regulator as a function of the voltage across the shunt resistor, as shifted down by the level shifting resistors and measured across the sense pins, wherein the controller is configured to sense the input voltage of the regulator as a function of the current flowing through either one of the level shifting resistors, as measured at one of the sense pins, wherein the controller comprises a calibration circuit configured to measure the voltage across the sense pins when the input current is expected to be near zero and produce a calibrated value which indicates mismatch between the level shifting resistors, and to use the calibrated value in adjusting the input voltage and current sensing during operation.

* * * * *